United States Patent
Ren et al.

(10) Patent No.: US 10,055,349 B2
(45) Date of Patent: Aug. 21, 2018

(54) CACHE COHERENCE PROTOCOL

(71) Applicant: HGST Netherlands B.V., Amsterdam (NL)

(72) Inventors: Jin Ren, Acton, MA (US); Ken Qing Yang, Saunderstown, RI (US); Gregory Evan Fedynyshyn, Sudbury, MA (US)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 101 days.

(21) Appl. No.: 15/081,064

(22) Filed: Mar. 25, 2016

(65) Prior Publication Data

US 2016/0210232 A1   Jul. 21, 2016

Related U.S. Application Data

(63) Continuation of application No. 14/277,492, filed on May 14, 2014, now Pat. No. 9,298,624.

(51) Int. Cl.
*G06F 12/08*   (2016.01)
*G06F 12/12*   (2016.01)
(Continued)

(52) U.S. Cl.
CPC ............ *G06F 12/0833* (2013.01); *G06F 3/06* (2013.01); *G06F 3/064* (2013.01); *G06F 3/065* (2013.01);
(Continued)

(58) Field of Classification Search
CPC ............. G06F 12/0833; G06F 2212/69; G06F 2212/282; G06F 2212/314
(Continued)

(56) References Cited

U.S. PATENT DOCUMENTS 6,094,709 A     7/2000   Baylor et al.
6,757,787 B2    6/2004   Shen et al.
(Continued)

OTHER PUBLICATIONS

"Cache Invalidation and Propagation in Distributed Caching"—Pooja Chirkova, NCSU, Feb. 15, 2005 http://www4.ncsu.edu/~rychirko/Papers/techReport021505.pdf.*
(Continued)

*Primary Examiner* — Randy Scott
(74) *Attorney, Agent, or Firm* — McDermott Will & Emery LLP

(57) ABSTRACT

The present disclosure relates to systems, methods, and computer program products for keeping multiple caches updated, or coherent, on multiple servers when the multiple caches contain independent copies of cached data. Example methods may include receiving a request to write data to a block of a first cache associated with a first server in a clustered server environment. The methods may also include identifying a second cache storing a copy of the block, where the second cache is associated with a second server in the clustered environment. The methods may further include transmitting a request to update the second cache with the received write data, and upon receiving a subsequent request to write subsequent data, identifying a third cache for invalidating based on access patterns of the blocks, where the third cache is associated with a third server in the clustered environment.

20 Claims, 13 Drawing Sheets

(51) Int. Cl.
G06F 12/0831 (2016.01)
G06F 12/0815 (2016.01)
H04L 29/08 (2006.01)
G06F 3/06 (2006.01)
G06F 15/167 (2006.01)
G06F 17/30 (2006.01)
G06F 12/122 (2016.01)
G06F 12/128 (2016.01)

(52) U.S. Cl.
CPC ............ *G06F 3/067* (2013.01); *G06F 3/0613* (2013.01); *G06F 12/0815* (2013.01); *G06F 12/122* (2013.01); *G06F 12/128* (2013.01); *G06F 15/167* (2013.01); *G06F 17/30* (2013.01); *H04L 29/08* (2013.01); *H04L 67/1095* (2013.01); *H04L 67/1097* (2013.01); *G06F 2212/1021* (2013.01); *G06F 2212/154* (2013.01); *G06F 2212/163* (2013.01); *G06F 2212/222* (2013.01); *G06F 2212/254* (2013.01); *G06F 2212/264* (2013.01); *G06F 2212/282* (2013.01); *G06F 2212/286* (2013.01); *G06F 2212/314* (2013.01); *G06F 2212/621* (2013.01)

(58) Field of Classification Search
USPC ......... 711/119, 130, 135, 141, 144; 709/213
See application file for complete search history.

(56) References Cited

U.S. PATENT DOCUMENTS

| | | | |
|---|---|---|---|
| 7,162,476 B1 | 1/2007 | Belair et al. | |
| 8,140,772 B1 | 3/2012 | Yang | |
| 8,392,658 B2 | 3/2013 | Wang et al. | |
| 9,069,587 B2* | 6/2015 | Agarwal | G06F 9/45558 |
| 2003/0204678 A1 | 10/2003 | Lee | |
| 2010/0163415 A1 | 7/2010 | Resor et al. | |
| 2011/0320733 A1 | 12/2011 | Sanford et al. | |
| 2012/0023067 A1* | 1/2012 | Clegg | G06F 17/30575 707/634 |
| 2012/0054444 A1* | 3/2012 | Wang | G06F 12/127 711/133 |
| 2012/0215970 A1 | 8/2012 | Shats | |
| 2012/0296873 A1* | 11/2012 | Saldhana | G06F 21/6218 707/636 |
| 2014/0181377 A1* | 6/2014 | Kimmel | G06F 12/0246 711/103 |
| 2014/0282770 A1 | 9/2014 | McKinley et al. | |

OTHER PUBLICATIONS

Grahn, et al., "Implementation and Evaluation of Update-Based Cache Protocols Under Relaxed Memory Consistency Models", Future Generation Computer Systems, 11(3):247-271, Jun. 1995, 32 pages.

Hagander, "Database Driven Cache Invalidation," JDCon—West, Aug. 2010 http://www.hagander.net/talks/Database%20driven%20cache%20invalidation.pdf.

Qlogic, "The Value of Shared Cache in Enterprise Computing: Qlogic FabricCache 10000 Series Adapters Integrate Flash-Based Cache with SAN Connectivity", White Paper, SN0430912-00 Rev. C, Jul. 2013, 6 pages.

\* cited by examiner

CACHE COHERENCE PROTOCOL

RELATED APPLICATIONS

This application is a continuation application of U.S. application Ser. No. 14/277,492, filed May 14, 2014, entitled "Systems and Methods for Cache Coherence Protocol," issued as U.S. Pat. No. 9,298,624, which is expressly incorporated herein by reference in its entirety.

FIELD OF THE DISCLOSURE

The present disclosure relates to systems and methods for cache coherence in a multi-server clustered environment.

BACKGROUND

Caches speed access to data by using hierarchies of memory. The memory generally includes combinations of faster memory (generally higher cost) and slower memory (generally lower cost). An example of faster memory may include volatile memory such as random access memory (RAM). An example of slower memory may include non-volatile memory such as a hard disk.

If a computer system receives a request to read or write data corresponding with a memory block, the system may first check whether the requested block is cached, meaning whether the cache contains a copy of the corresponding data. If the requested block is cached, the system may perform the requested read or write operation on the cached copy stored in the faster memory, without having to wait for the slower memory.

For example, if the system receives a read request, the system may fulfill the read request by retrieving the cached data from the faster memory instead of the slower memory. In response to a read request, a "cache read hit" indicates that the cache contains data corresponding to a requested block. A "cache read miss" indicates the cache does not contain the requested data, and so the system must read the requested data from slower storage.

Similarly, if the system receives a write request, the system may update a cached copy in the faster memory and complete the requested operation, without having to wait for the slower memory to update. In response to a write request, a "cache write hit" indicates that the cache contains the requested block, and so the system may proceed to update the faster memory without having to wait for the slower memory. The system may then choose either to proceed to write to the slower memory, or defer writing to the slower memory, perhaps until the system has batched a number of write operations for efficiency. A "cache write miss" indicates the cache does not contain the requested data, and so the system must update the slower memory.

SUMMARY

The present disclosure relates to systems, methods, and computer program products for keeping multiple caches updated, or coherent, on multiple servers when the multiple caches contain independent copies of cached data.

In one embodiment, the present disclosure provides a method of updating a cache in a clustered server environment. The method may include receiving a request to write data to a block of a first cache associated with a first server in the clustered server environment, where multiple servers in the clustered environment have an associated cache. The method may further include identifying a second cache storing a copy of the block, where the second cache is associated with a second server in the clustered environment. The method may further include transmitting a request to update the second cache with the received write data, whereby future requests are able to process the received write data from the second cache. The method may also include, upon receiving a subsequent request to write subsequent data, identifying a third cache for invalidating based at least in part on access patterns of the blocks, where the third cache is associated with a third server in the clustered environment.

In one embodiment, the present disclosure provides a system for updating a cache in a clustered server environment. The system may include a server, where the server may include a network interface, a cache, and a processor. The network interface may be configured to transmit and receive requests. The cache may be configured to store blocks and data associated with the blocks. The processor may be in communication with the network and to the cache. The processor may be configured to receive, over the network interface, a request to write data to a block of the cache. The processor may be configured to identify a second cache storing a copy of the block, where the second cache is associated with a second server in the clustered environment. The processor may be configured to transmit, over the network interface, a request to update the second cache with the received write data, whereby future requests are able to process the received write data from the second cache. The processor may be configured to upon receiving, over the network interface, a subsequent request to write subsequent data, identify a third cache for invalidating based at least in part on access patterns of the blocks, where the third cache is associated with a third server in the clustered environment.

In one embodiment, the present disclosure provides a non-transitory computer program product for updating a cache in a clustered environment. The computer program product may be tangibly embodied in a computer-readable medium. The computer program product may include instructions operable to cause a data processing apparatus to receive a request to write data to a block of a first cache associated with a first server in the clustered server environment, where multiple servers in the clustered environment have an associated cache. The computer program product may include instructions operable to identify a second cache storing a copy of the block, where the second cache is associated with a second server in the clustered environment. The computer program product may include instructions operable to transmit a request to update the second cache with the received write data, whereby future requests are able to process the received write data from the second cache. The computer program product may include instructions operable to, upon receiving a subsequent request to write subsequent data, identify a third cache for invalidating based at least in part on access patterns of the blocks, where the third cache is associated with a third server in the clustered environment.

The embodiments described herein may include additional aspects. For example, the methods, systems, and computer program products may further include transmitting a request to invalidate the third cache based at least in part on the access patterns of the blocks. The access patterns may include a frequency of access of the block or a recency of access of the block. The identifying the second cache may include looking up the received block from one or more cache coherence tables tracking blocks and associated servers, and the one or more cache coherence tables may be distributed across multiple servers. The one or more cache coherence tables may be partitioned into subtables according to a hash function. Transmitting the request to update the second cache may include identifying a corresponding row of the one or more cache coherence tables based on the received block, updating the corresponding cache status of the corresponding row, and transmitting the request to update the block of the second cache with the received write data. The block may include a logical block address (LBA), and the cache may be implemented using a solid state drive (SSD).

BRIEF DESCRIPTION OF THE DRAWINGS

Various objects, features, and advantages of the present disclosure may be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

DETAILED DESCRIPTION

Figure 1:
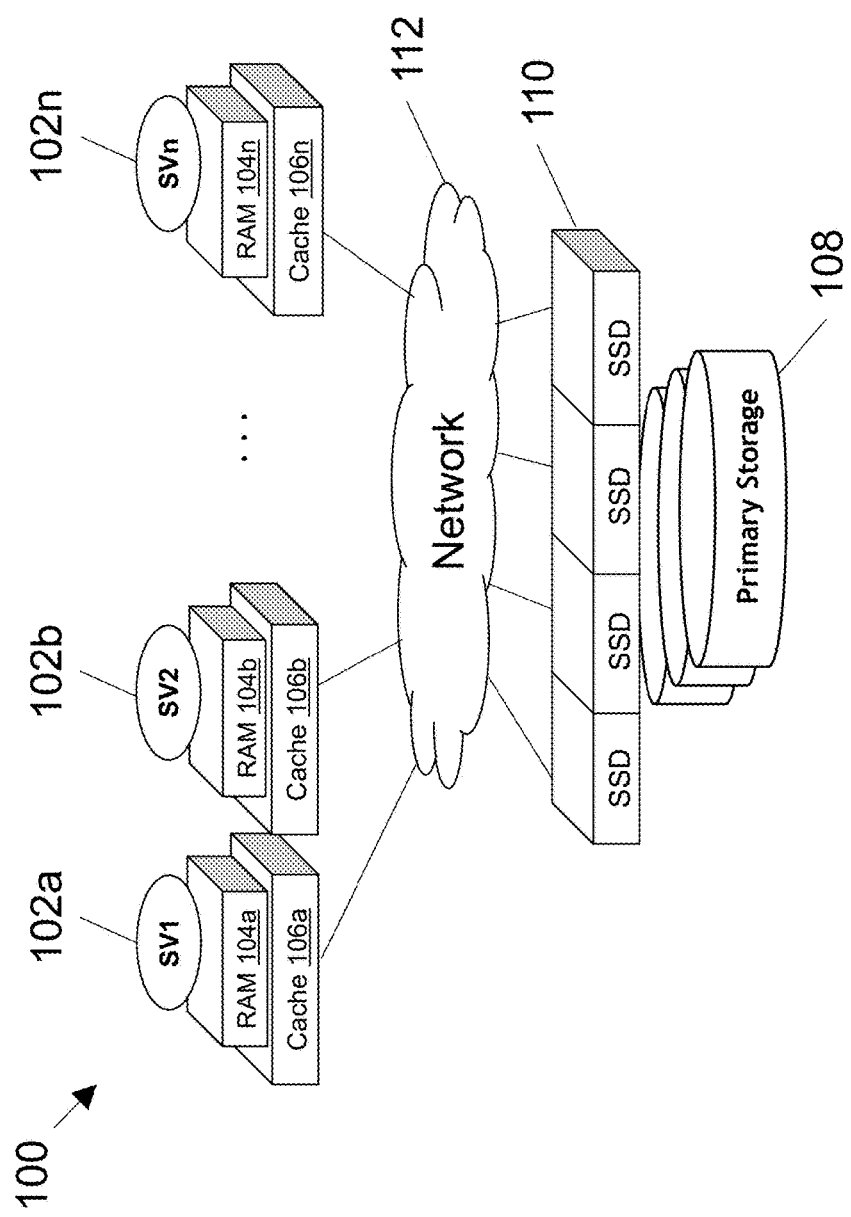
FIG. 1 illustrates an example system including the present cache coherence protocols, in accordance with some embodiments.

The present systems and methods relate to a cache coherence protocol for clustered server environments. A cache coherence protocol refers to systems and methods for keeping multiple caches updated, or coherent, when the multiple caches contain independent copies of cached data. Clustered server environments may use hierarchical storage, including multiple caches associated with multiple servers, such that each server has an associated cache. The present cache coherence protocol keeps multiple caches coherent using an eager update and lazy invalidate protocol (sometimes referred to herein as EULIP). The present systems and methods generally include two parts: (1) eager update, and (2) lazy invalidation.

Regarding eager update, upon receiving an initial write request, the present cache coherence protocol updates other corresponding copies of cached blocks, stored in other servers belonging to the cluster. A result of the present "eager updates" is that future accesses of the other servers may result in a cache read hit or cache write hit when the request next accesses the same block.

Regarding lazy invalidation, upon a determination that further copies of corresponding blocks cached in further servers in the cluster are inactive, the present cache coherence protocol invalidates the further copies determined to be inactive. The present cache coherence protocol thereby defers invalidation, until making a later determination that further copies are inactive. In some embodiments, the determination of inactivity is based on access patterns such as whether a block has historically been frequently and/or recently accessed. Invalidation causes future read accesses to previously cached data to result in a cache read miss. In some embodiments, invalidation may trigger the cache to evict and flush the cached block to storage, thereby freeing room in the cache to store more data. By using the present cache coherence protocol, the present systems and methods improve cache performance while lowering network overhead. Update messages as used in the present eager updates may require more network bandwidth than invalidate messages, because update messages generally include the new value to be updated—i.e., update messages generally include a new value that should be assigned to the current block. The present "lazy invalidation" further lessens the burden of additional network traffic. Unlike traditional cache coherence protocols, the present cache coherence protocol does not cause every other server to invalidate their contents, but rather only targeted servers based on access patterns. The present system therefore lessens the network burden associated with cache misses that may force the server to retrieve the underlying data over the network from shared storage.

Storage systems using the present cache coherence protocol may include different types of storage media such as phase change memory (PCM), ferroelectric random access memory (FRAM or FeRAM), magneto resistive random access memory (MRAM), flash memory, and hard disk drive. These different types of storage media exhibit various tradeoffs between access speeds and cost. High speed and high cost storage media such as PCM, FRAM, MRAM, and flash memory may be deployed as caches to improve performance of underlying hard drives, thereby forming a storage hierarchy. Caches may be transparent to applications and managed automatically by system software or hardware. As described in further detail below, server clusters may include such cache hierarchical storage, such as server clusters found in data centers and cloud-based environments. The present cache coherence protocol improves reliability and performance of such clustered environments. Traditional cache coherence protocols have limitations, both in terms of cache performance and reliability.

FIG. 1 illustrates an example system 100 including the present cache coherence protocols, in accordance with some embodiments. System 100 includes a clustered environment of servers 1-*n* (102*a*-102*n*) in communication with primary storage 108 and secondary storage 110. In some embodiments, primary storage 108 may be shared and secondary storage 110 is optional. Primary storage 108 may be, for example, a hard drive, and secondary storage 110 may be a solid state drive or disk (SSD). Servers 1-*n* (102*a*-102*n*) include temporary or volatile memory 104*a*-104*n* such as random access memory (RAM). Servers 1-*n* (102*a*-102*n*) also include caches 106*a*-106*n*. In some embodiments, caches 106*a*-106*n* are SSDs. System 100 communicates cache commands over network 112. Example cache commands may include update commands and invalidation commands, discussed in further detail below.

Servers 1-*n* (102*a*-102*n*) illustrate multiple clustered servers. Servers 1-*n* (102*a*-102*n*) share a global storage system, including primary storage 108 and secondary storage 110. Each server 1-*n* (102*a*-102*n*) may have high speed nonvolatile storage used as storage cache. In some embodiments, the high-speed nonvolatile storage includes PCM, FRAM, MRAM, RAM, or flash memory as described earlier. The present system may also include multiple cache levels for each server, if speed and cost characteristics of the storage warrant such a configuration. For example, caches 106*a*-106*n* may include Level 3 (L3) cache memory, faster Level 2 (L2) cache memory, and still faster Level 1 (L1) cache memory. Each server may potentially cache a copy of any data block in shared storage, without restriction. In some embodiments, system 100 maintains a cache coherence directory including one or more cache coherence tables that track shared data blocks residing on multiple caches 106*a*-106*n*. The cache coherence tables may be accessed frequently if the intensity of data sharing is high. In some embodiments, to avoid potential performance bottlenecks of the cache coherence tables, system 100 uses distributed implementations. For example, in a multi-server cluster environment having N servers 102*a*-102*n*, system 100 may partition the cache coherence tables into N parts according to a hash function. System 100 may then assign each of the N parts to a server 102*a*-102*n* that is designated as responsible for maintaining that part of the cache coherence table.

Caches 106*a*-106*n* may include SSDs built using semiconductor technologies and used as a caching layer between primary storage 108 and system RAM 104*a*-104*n* of a server (102*a*-102*n*). In a clustered environment, each server (102*a*-102*n*) in the multi-server cluster may have a cache 106*a*-106*n* to speed input/output (I/O) operations, resulting in multiple caches 106*a*-106*n* in the cluster shown in system 100.

Techniques for caching data blocks in such a multiple cache system 100 has become a design decision of interest for distributed and hierarchical storage systems. In general, according to some embodiments, two different types of caching designs for distributed cache systems may be used: (1) data partitioning, and (2) dynamic coherent caching. For the reasons described below, the present cache coherence protocols may improve a dynamic coherent caching design. Dynamic coherent caching may generally perform better than data partitioning, especially when dynamic coherent caching uses the present cache coherence protocols. The first caching design, data partitioning, includes dividing, or partitioning, an entire data set to be cached into N parts (for an N-node system). That is, a cache 106*a*-106*n* in each of the N nodes caches or stores one of the N parts of data. System 100 may contain only a single copy of the data on any cache 106*a*-106*n*. The second caching design, dynamic coherent caching, allows multiple caches 106*a*-106*n* to cache copies of data blocks, so that efficient data sharing is possible. Therefore, more than one cache 106*a*-106*n* may contain a copy of a given data block. Each caching design has advantages and disadvantages, discussed in further detail below.

A data partitioning design may exhibit poorer network performance than a dynamic coherent caching system using the present cache coherence protocols. This is because, with a data partitioning design, each data block may have only a single copy in one of N caches 106*a*-106*n*. In some embodiments, the present systems replicate the single copy, for example for fault tolerance. A cache 106*a*-106*n* holding a particular data block is often referred to as the "owner" of the data block. For example, if cache 106*a* on server 1 (102*a*) stores a data block of interest, cache 106*a* is responsible for correctness and reliability of the stored block. If another server such as server 2 (102*b*) requests a block that is not resident on local server cache 106*b*, server 2 (102*b*) sends requests through interconnection network 112 to obtain the block from its owner, cache 106*a* on server 1 (102*a*). Data partitioning designs do not generally allow multiple copies of blocks in partitioned caches. Accordingly, server 2 (102*b*) would not be expected to cache a copy of the requested block. Thus, for every follow-on read request for the contents of the same block, server 2 (102*b*) may have to repeat the requests through interconnection network 112 to obtain the contents of the requested block from the block's owner. Advantages of data partitioning include simple and easy implementation, a lack of cache coherence problems because only a single copy of data exists in system 100, and low performance overhead. For applications that do not share data or perform heavy write I/Os to owned data blocks, data partitioning exhibits good I/O performance. However, for applications that share data as supported by the present cache coherence protocols, data partitioning suffers from poor I/O performance and poor scalability, because all I/O operations for remote blocks (i.e., blocks that are not locally owned) involve network transactions over network 112. Such network transactions may be extensive, leading to network contention and long I/O latencies. Furthermore, the particular server holding a requested copy of shared data may become a performance and reliability bottleneck, since all I/Os from different servers for shared data stored on the particular server request the stored data from the particular server, for every I/O request.

Figure 2:
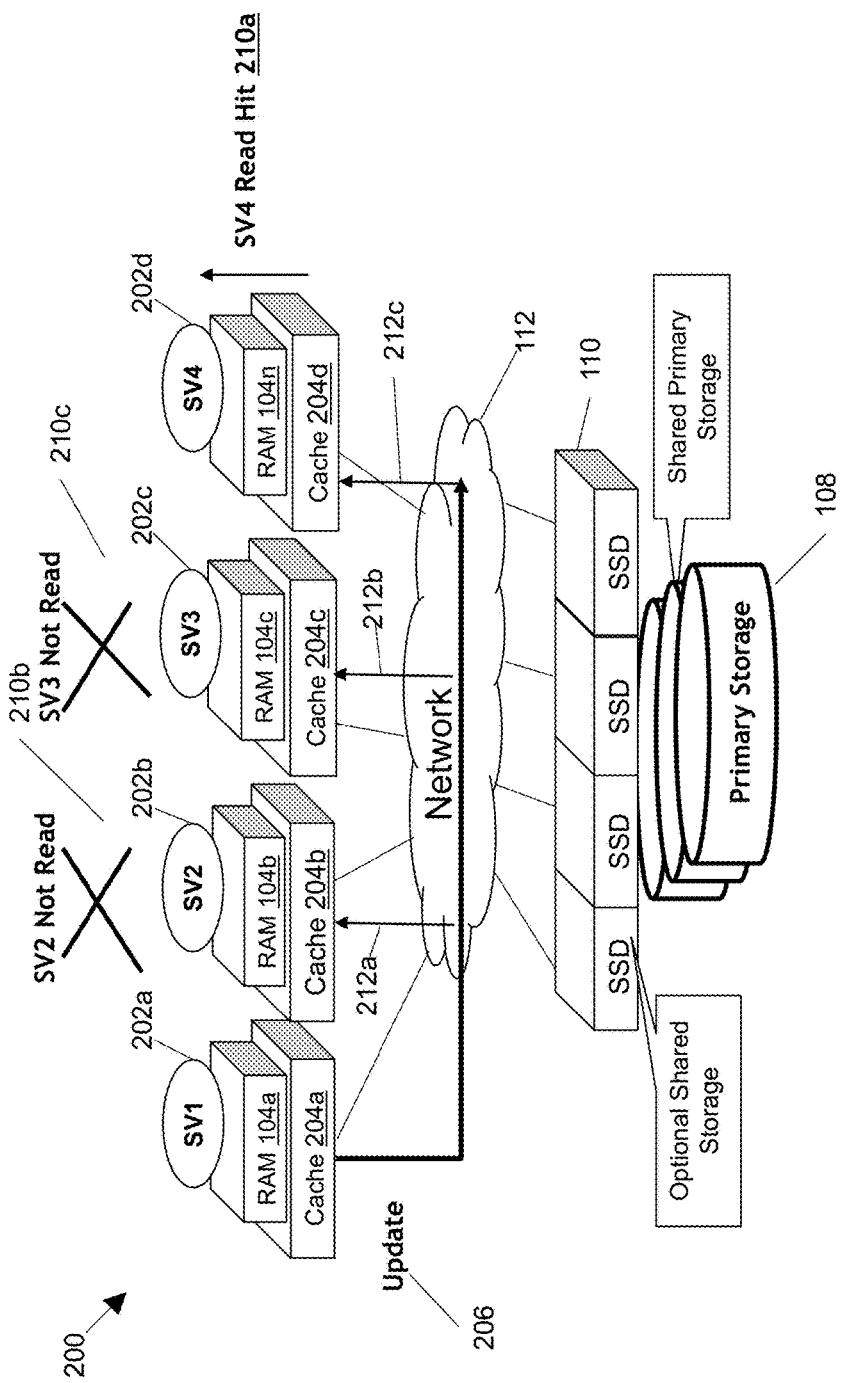
FIG. 2 illustrates an example system including the present cache coherence protocols, in accordance with some embodiments.

FIG. 2 illustrates an example system 200 including the present cache coherence protocols, in accordance with some embodiments. System 200 illustrates an update-based coherence protocol in a dynamic coherent caching system, as described below. System 200 includes a clustered environment of servers 1-4 (202*a*-202*d*) in communication with primary storage 108 and secondary storage 110. Servers 1-4 (202*a*-202*d*) include caches 204*a*-204*d* and random access memory (RAM) 104*a*-104*n*. System 200 also includes update request 206 communicated over network 112. Update request 206 results in read hit 210*a* for server 4 (202*d*), and no read hits 210*b*-210*c* for servers 2 and 3 (202*b*, 202*c*).

In contrast to data partitioning, described earlier in connection with FIG. 1, dynamic coherent caching allows multiple shared copies of a cached data block to exist in multiple caches, on multiple servers in the clustered environment of system 200. If a node writes a data block once, and many nodes read the cached data block many times, coherent data caching has numerous advantages. Multiple servers 202*a*-202*d* may access shared data locally in their respective local caches 204*a*-204*d*, without requiring relatively slower network transactions over network 112. As a result, dynamic coherent caching may exhibit better scalability in a cluster environment such as system 200, and provide better I/O performance if applications share data while running in a cluster.

However, since multiple physical copies of the same logical data exist in multiple caches 204a-204d, keeping these multiple copies coherent (i.e., consistent with one another) adds design considerations. Therefore, the present cache coherence protocol provides a way to keep multiple copies of data blocks coherent or consistent with one another. In general, the present cache coherence protocol improves upon two categories of basic cache coherence protocols: (1) invalidate-based coherence protocols, and (2) update-based cache coherence protocols.

An invalidate-based cache coherence protocol invalidates all other copies of blocks cached on other servers, upon a write I/O of a block. As a result, the local cache of a single server becomes the only cache storing the block. No other caches in the cluster have (valid) copies of the block. The invalidate-based cache coherence protocol uses relatively fewer network operations than an update-based cache coherence protocol. In contrast, the update-based cache coherence protocol updates other cached copies of a block stored on other servers, upon a write I/O of a block. As a result, all other servers caching copies of a block have updated copies of the block.

The update-based cache coherence protocol results in increased amounts of network traffic compared to the invalidate-based cache coherence protocol, because the present systems and methods use additional network traffic to communicate the new value for caches 204a-204d to associate with a block. There are challenges and complexities involved in implementing either basic cache coherence protocol.

Multiple server system 200 may keep a cache coherence directory, if multiple server system 200 lacks a shared snoopy bus. A snoopy bus monitors ("snoops" on) a shared memory bus in a multi-computer or multi-processor environment, to detect writes to cached values. The snoopy bus detects writes to cached values even if the shared memory bus receives the writes from other processors or distributed computers. However, a "snoopy bus" may only work in computer architectures in which all processors share a single memory bus. The present cache coherence protocols therefore improve on a snoopy bus because the present cache coherence protocols do not require all processors to share a single memory bus. In contrast, the present cache coherence protocols may operate in multi-server clustered environments where the servers have separate memory buses.

Therefore, in some embodiments the present systems and methods use a cache coherence directory instead of a snoopy bus. Upon receiving an I/O operation, the present systems consult the directory to identify actions to be performed for the I/O operation. For example, when receiving a read I/O and upon a resulting cache read hit, the invalidate-based cache coherence protocol and the update-based cache-coherence protocol generally operate similarly. That is, server 202a-202d generally reads the requested data from local cache 204a-204d, without modifying the cache coherence directory. On the other hand, cache read misses may involve different operations, depending on whether the present systems will fetch the data from the owner cache (faster) or from underlying primary storage (slower). At the same time, the present systems update cache directory information to reflect the new cached copy resulting from the cache read miss. Furthermore, as described in further detail below, the basic cache coherence protocols differ for write I/Os.

In case of the invalidate-based cache coherence protocol, a cache write hit changes the local cached state of the cached block to dirty and transmits a command to invalidate all other cached copies stored on other servers. Similarly, a cache write miss loads the missed data also in a dirty state and transmits a command to invalidate all other cached copies if any other servers in the cluster are caching the same block. Therefore, after a received write I/O on a block for an invalidate-based cache coherence protocol, the local cache of a single server becomes the only cache storing the block. No other caches in the cluster have copies of the block. As a result, any subsequent received read I/Os to the block from other servers results in cache read misses and corresponding network transactions to retrieve the requested block from other servers or from shared storage 108, 110, to satisfy the read request.

The update-based cache coherence protocol aims to overcome this potential performance slow down, by updating other cached copies in the cluster upon a received write I/O. For example, when server 1 (202a) receives a write I/O, server 1 (202a) transmits an update command 206 to servers 2-4 (202b-202d). Update command 206 results in updates 212a-212c for servers 2-4 (202b-202d). As a result, all caches 204a-204d have the most up-to-date copy of a data block. Subsequent read I/Os to cached blocks in any caches 204a-204d become more likely to be cache read hits such as cache read hit 210a, leading to better I/O performance. However, such performance gains come at a cost of high network traffic, because the update-based cache coherence protocol updates data blocks upon each write I/O. Accordingly, if a server such as server 1 (202a) writes a block many times but other servers such as servers 2 and 3 (202b, 202c) do not read the block much (210b-210c), the extra network traffic may not result in performance improvements.

These basic cache coherence protocols exhibit advantages and disadvantages. The invalidate-based cache coherence protocol has lower network overhead for coherence enforcement, but also limited data sharing performance due to high cache read miss ratios. The update-based cache coherence protocol, on the other hand, exhibits better cache performance because of a potentially higher cache hit ratio for shared data, though the update-based cache coherence protocol may introduce unnecessary network traffic for updating data blocks if the updated blocks are not accessed frequently by other servers.

Figure 3A:
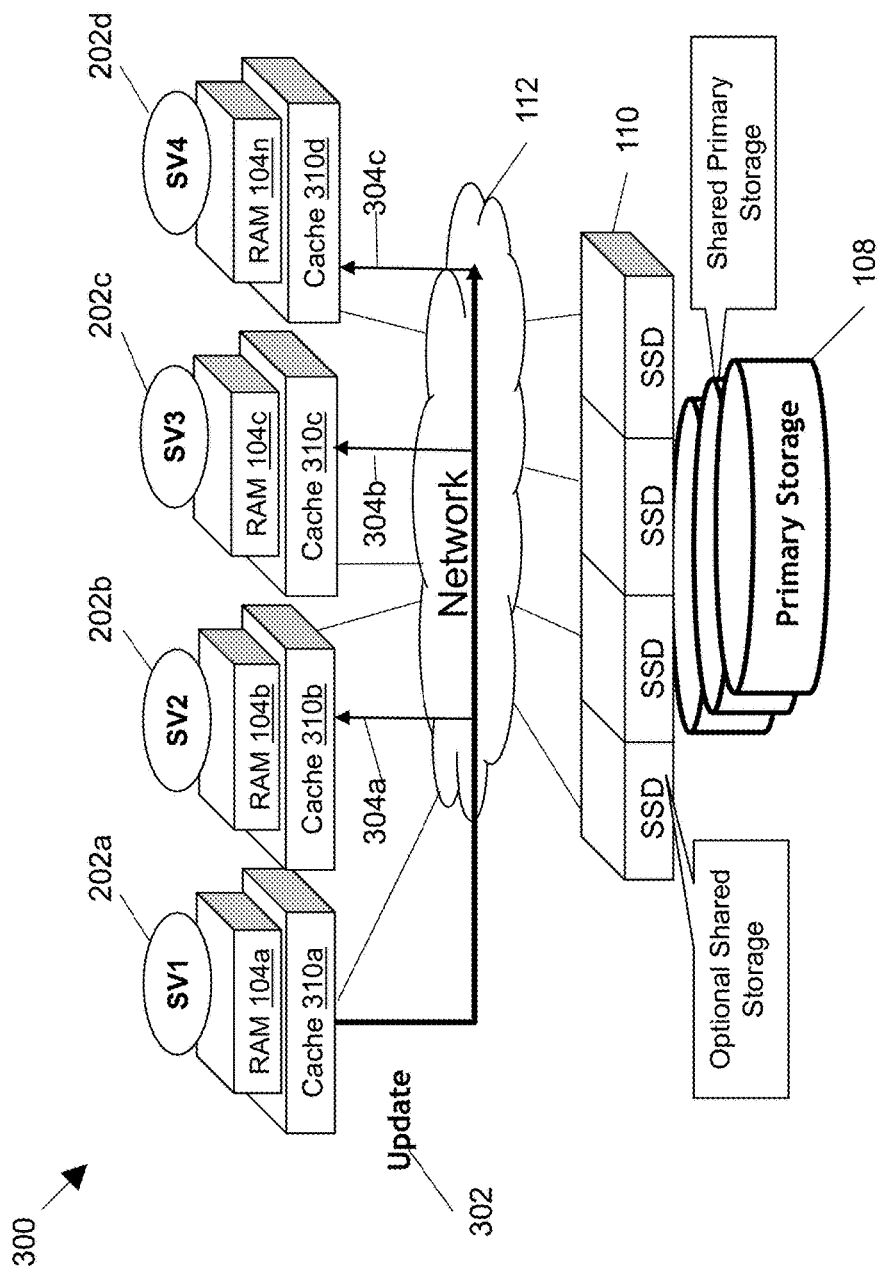
FIG. 3A illustrates an eager update stage of an example system that includes the present cache coherence protocols, in accordance with some embodiments.

FIG. 3A illustrates an eager update stage of an example system 300 that includes the present cache coherence protocols, in accordance with some embodiments. System 300 includes servers 1-4 (202a-202d) in communication with primary storage 108 and secondary storage 110 over network 112. Servers 1-4 (202a-202d) include caches 310a-310d and random access memory (RAM) 104a-104n. Servers 1-4 (202a-202d) are in communication over network 112. The communication over network 112 may include update commands 302, 304a-304c.

As described earlier, the present cache coherence protocol performs "eager" updates and "lazy" invalidates. Specifically, the present cache coherence protocol performs "eager" updates by updating all cached copies on servers that are caching a requested block, upon the first write I/O to the block. For example, assume server 1 (202a) receives a write request (not shown) to write data to a block cached in cache 310a. The write request triggers server 1 (202a) to issue update command 302. According to the present eager update, server 1 (202a) transmits corresponding update commands 304a-304c to other servers 2-4 (202b-202d) that are caching copies of the requested block. The present eager update brings performance benefits in anticipation of cache read hits or cache write hits of subsequent I/Os to the block copies cached on other servers.

Figure 3B:
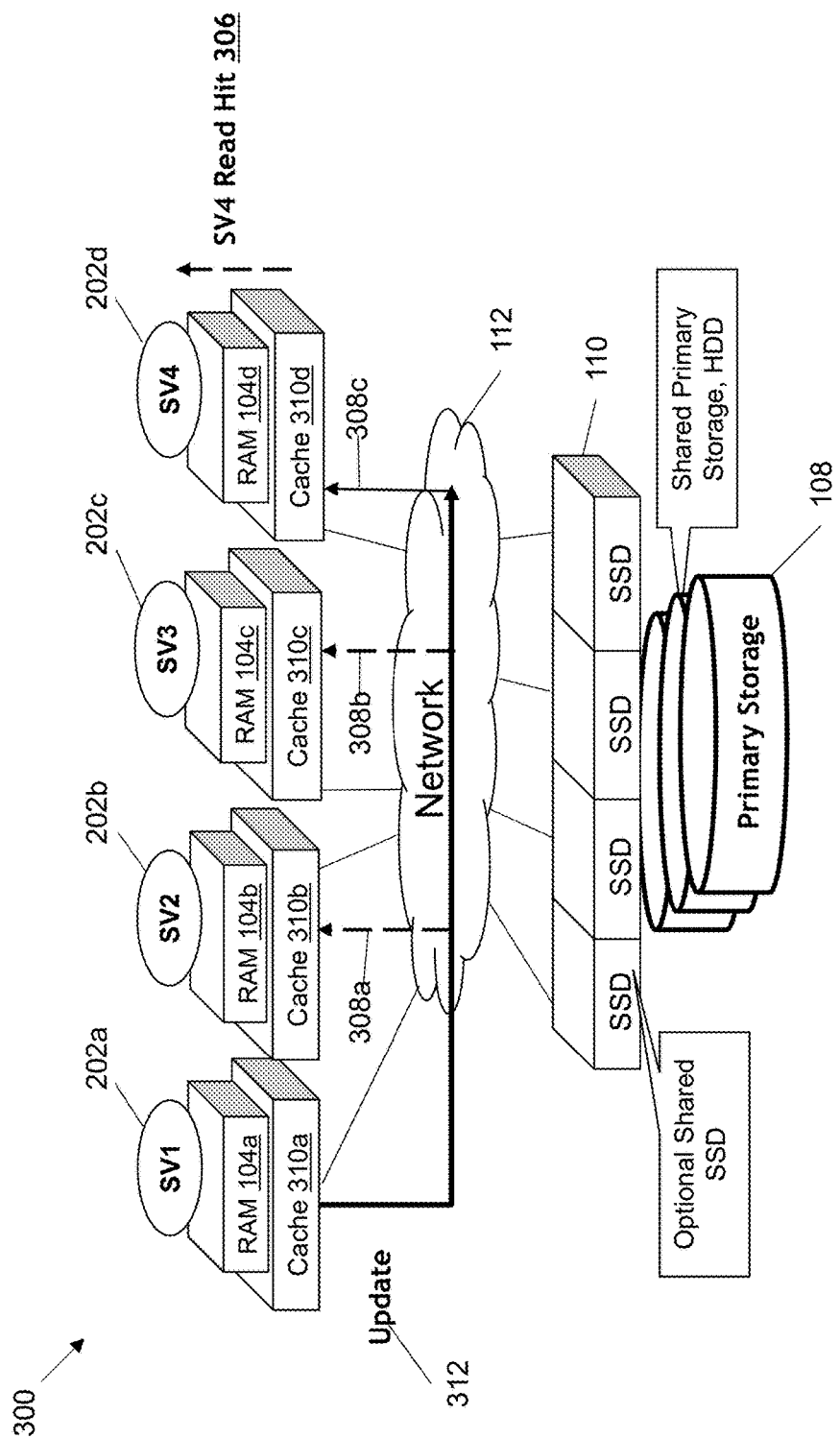
FIG. 3B illustrates a lazy invalidation stage of an example system that includes the present cache coherence protocols, in accordance with some embodiments.

FIG. 3B illustrates a lazy invalidation stage of an example system 300 that includes the present cache coherence protocols, in accordance with some embodiments. The elements are as described in FIG. 3A, except for update command 312, read hit 306, invalidate commands 308a-308b, and update command 308c.

During subsequent write I/Os to a block, the present cache coherence protocol determines whether to invalidate or continue updating copies of the block cached on other servers. In some embodiments, the determination is based on access patterns to the block. In further embodiments, the access patterns include determining a recency and/or frequency of access of the block. In other words, the access patterns include determining how often and how recently the other servers caching the block access the cached block. Accordingly, the present cache coherence protocol performs "lazy," or deferred, invalidates. The invalidates are "lazy" compared to the invalidate-based cache coherence protocol described earlier. For the invalidate-based cache coherence protocol, upon receiving the initial write request, the invalidate-based cache system invalidates all cached blocks on all other servers. In contrast, the present cache coherence protocol may defer invalidation based on access patterns of the other servers to the block.

For example, upon receiving a subsequent write I/O request (not shown), the present cache coherence protocol issues a corresponding update request 312. The present cache coherence protocol determines only certain servers should be updated with the new data from the write I/O request. The present systems and methods identify servers to invalidate and servers to update based on access patterns to the requested block by the servers. For example, the present systems and methods may transmit invalidate commands 308a, 308b to servers 2 and 3 (202b, 202c) if the access patterns indicate servers 2 and 3 have never read the cached data. The present systems and methods may determine to transmit update command 308c to server 4 (202d) based on access patterns. An example access pattern may include if server 4 (202d) had a previous read hit 306, which indicates that server 4 is using the cached data. Therefore, the present cache coherence protocol strikes a balance between improving cache performance in updated servers, and lowering network overhead by sending invalidate requests to other servers instead of update requests. Update requests may use more network resources because the request may include the new data values for cached blocks. In contrast, invalidate requests may merely include the command to invalidate, without also having to transfer new data values for storage. The present cache coherence protocol thereby improves cache performance in clustered servers that share data.

Figure 3C:
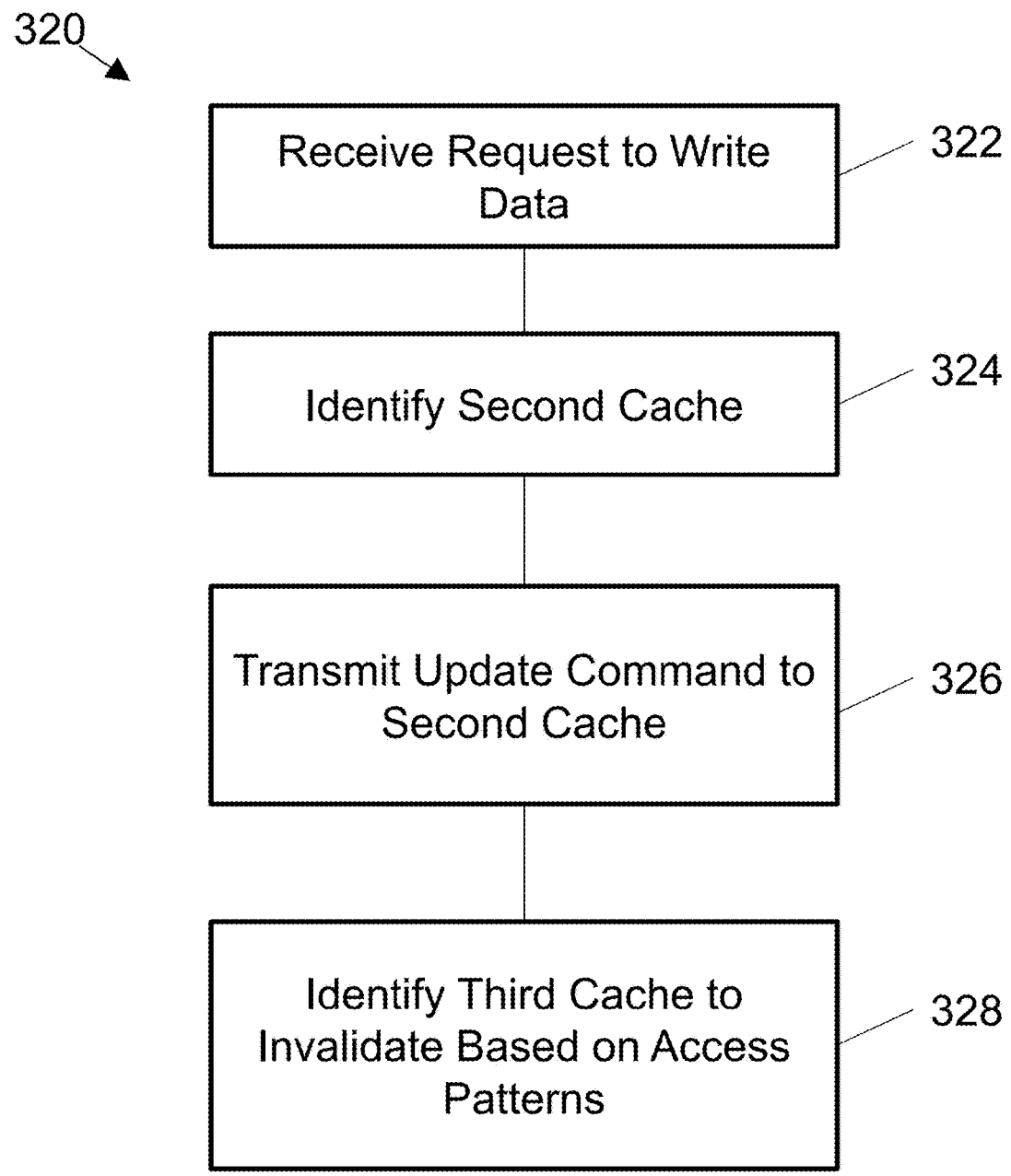
FIG. 3C illustrates a flowchart of an example method of updating a cache using the present cache coherence protocol, in accordance with some embodiments.

FIG. 3C illustrates a flowchart of an example method 320 of updating a cache using the present cache coherence protocol, in accordance with some embodiments. A server receives a request to write data, sometimes referred to herein as a write I/O (step 322). The server may form part of a multi-server clustered environment. The write request may identify a desired block, and desired data for writing to the block in a first cache. In some embodiments, the desired block is a logical block address (LBA). The server identifies at least a second cache in the clustered environment that contain copies of the desired block from the write request (step 324). In some embodiments, the identification may be based on local contents of a cache coherency directory, also referred to herein as a table or set of tables. Use of the cache coherency directory is described in further detail in connection with FIGS. 4, 5A, 6A, and 7A.

The server transmits an update command to the second cache (step 326). In some embodiments, the present system performs an "eager" update by transmitting the update command to all additional caches storing data corresponding to the desired block from the write request. The eager update brings performance benefits in anticipation of cache read hits or cache write hits of subsequent I/Os to the block copies cached on other servers. The present description of the second cache is for illustrative purposes only. Different cache coherence scenarios may involve invalidating the second cache and performing eager updates on different caches.

The server also defers invalidation ("lazy invalidation") of other caches until the server receives a subsequent write request. Upon receiving a subsequent write request to write new data to the desired block, the server identifies at least a third cache to invalidate, based on access patterns by the corresponding further servers. In some embodiments, the access patterns include a recency of accessing the desired cached block, or a frequency of accessing the desired cached block. For example, if a third server has recently accessed the cached data corresponding to the desired block (e.g., if the third server recently had a cache read hit), then the present systems may update the third server instead of invalidating the entry in the third cache. Similarly, if a third server has accessed the cached data frequently (e.g., if there are high numbers of cache read hits), then the present systems update the server instead of invalidating the cache entry. The present description of the third cache is for illustrative purposes only. Different cache coherence scenarios may involve updating the third cache and performing lazy invalidation on different caches. For example, if the third server has accessed the cached data long ago and has not recently accessed the data, the third server may invalidate the cached data to free up room in the third cache for caching more recent data. Still other implementations may not find a cache to invalidate, for example if all copies of a block are being accessed actively on all servers.

Figure 4:
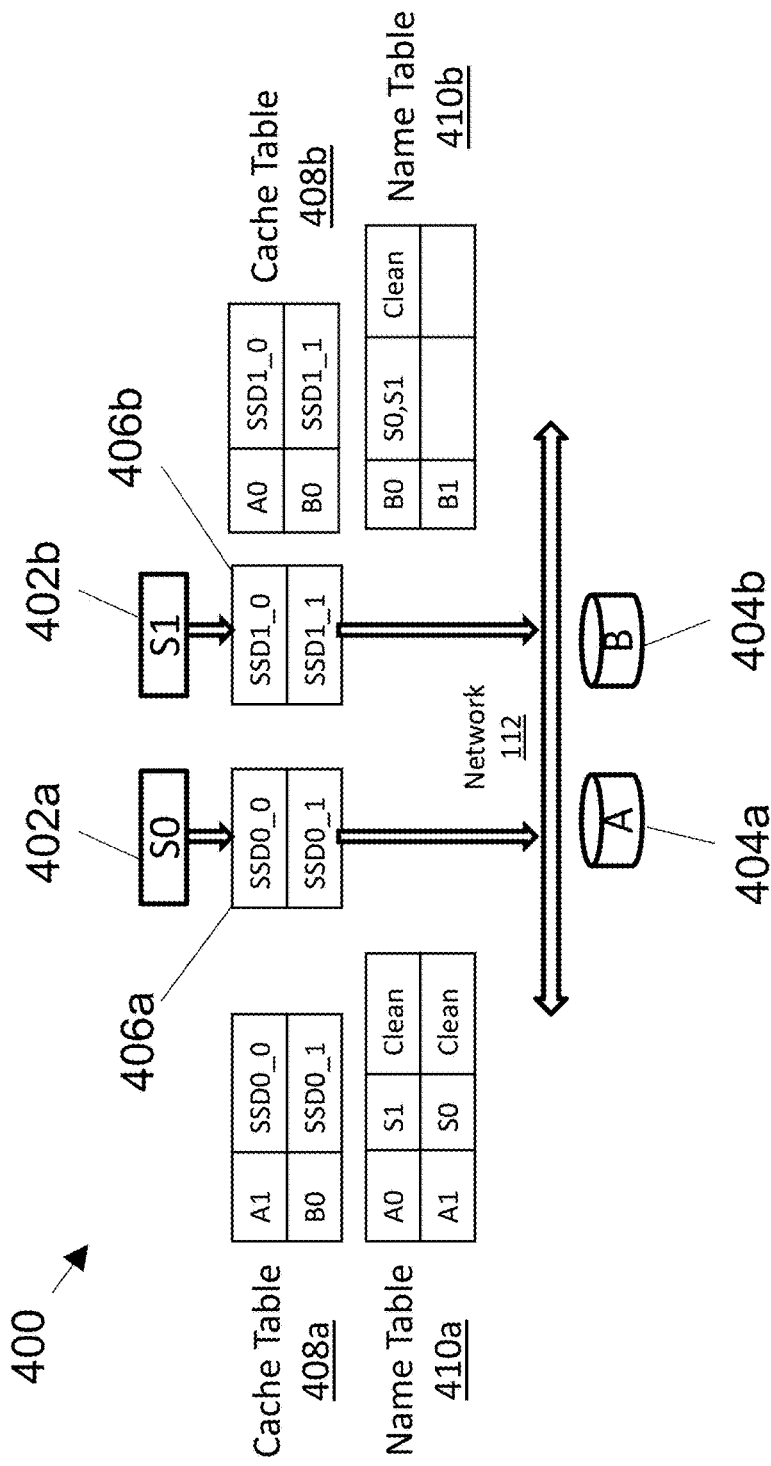
FIG. 4 illustrates an example cache directory structure for a two-server system.

FIG. 4 illustrates an example cache directory structure for a two-server system 400. System 400 includes servers S0 and S1 (402a-402b). Servers S0 and S1 (402a-402b) share storage volumes A and B (404a-404b) over network 112. Server S0 (402a) has cache SSD0 (406a) and server S1 (402b) has cache SSD1 (406b). In some embodiments, each cache has cache coherency directories referred to herein as a cache table (408a-408b) and a name table (410a-410b). Cache tables 408a-408b store a mapping of a local cache corresponding to the server. For example, cache table 408a indicates that data blocks A1 of volume A and B0 of volume B are cached in the cache corresponding to server S0 (402a). Cache table 408a also indicates that data blocks A1 and B0 are stored in locations SSD0_0 and SSD0_1, respectively. Similarly, cache table 408b indicates that data blocks A0 of volume A and B0 of volume B are cached in the cache corresponding to server S1 (402b), and stored in locations SSD1_0 and SSD1_1, respectively. The cache table generally stores the mapping of block logical block addresses (LBAs) and their corresponding locations in the SSD cache.

Name tables 410a-410b may also form part of the distributed cache coherence directory coherence enforcement. Name table 410a in the cache corresponding to server S0 (402a) stores information about blocks whose logical block addresses (LBAs) are hashed (i.e., assigned) to this cache. A hash function generates a unique fingerprint quickly that identifies underlying data such as LBAs. For example, the present systems and methods may use a modulo hash (or interleaving of low order bits of an LBA). According to the example hash results, LBAs A0 and A1 of volume A (404a) hash to server S0 (402a) while LBAs B0 and B1 of volume B (404b) hash to server S1 (402b). FIG. 4 illustrates resulting name tables 410a-410b.

Depending on the cache status of data blocks and name table information, the present systems and methods perform received I/O operations differently. The following paragraphs describe in further detail how the present caching works in response to various I/O requests, including: (1) cache read hits (FIGS. 5A-5B), (2) cache write hits (FIG. 6A-6B), (3) cache read misses (FIGS. 7A-7B), and (4) cache write misses (FIG. 8).

Figure 5A:
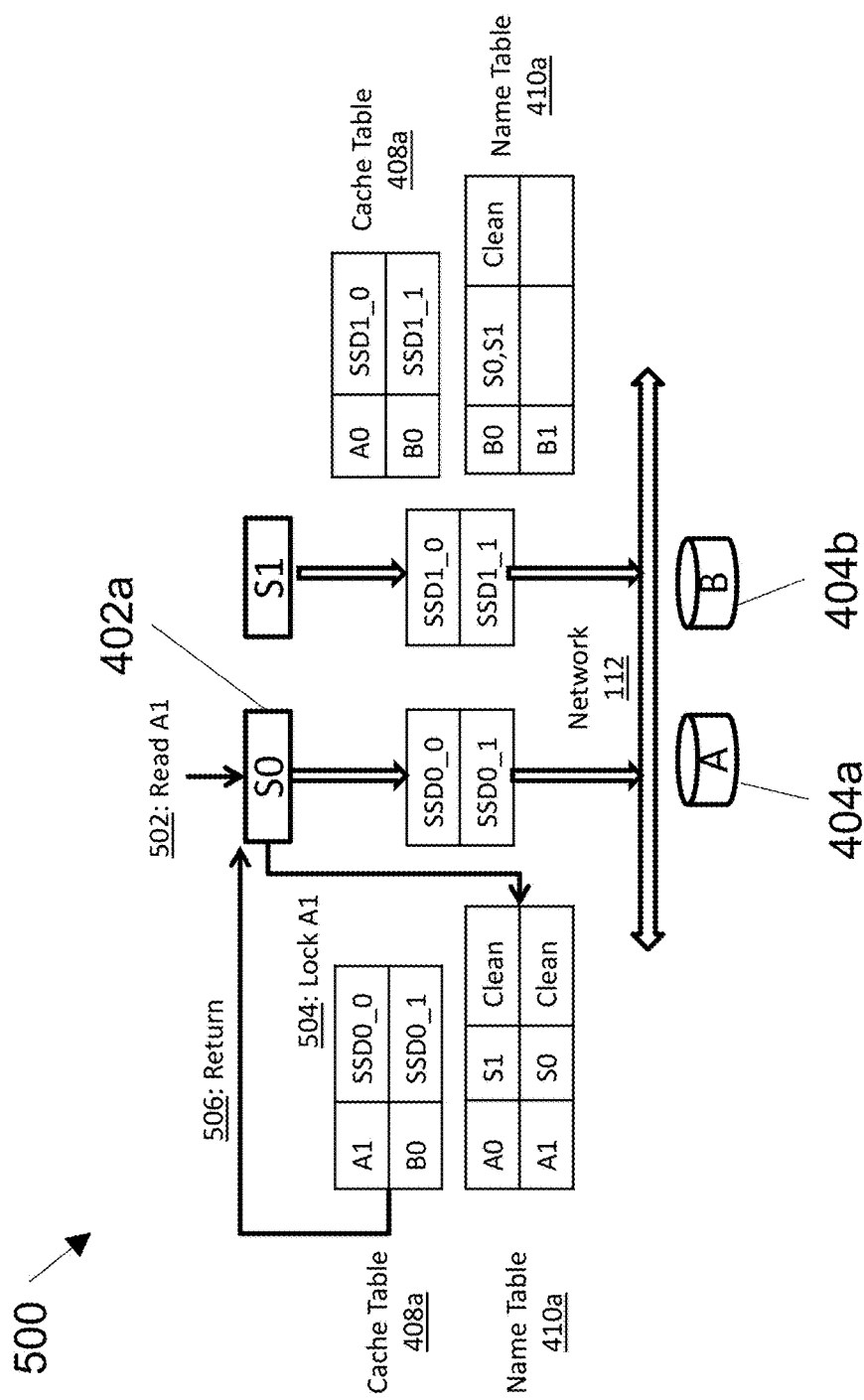
FIG. 5A illustrates example operation of a cache read hit in the present system using the present cache coherence protocols in accordance with some embodiments.

FIG. 5A illustrates example operation of a cache read hit in system 500 using the present cache coherence protocols in accordance with some embodiments. System 500 includes server S0 (402a), cache tables 408a-408b, name tables 410a-410b, read hit 502, lock 504, and return data 506. Server S0 (402a) may be in communication with storage volumes A and B (404a-404b) over network 112. A cache read hit occurs if a server finds a requested block in the local cache. For example, server S0 (402a) receives read I/O 502 requesting the contents of logical block address (LBA) A1. The received read I/O triggers a search of cache table 408a, which results in a read hit, indicating that block A1 is in the cache. Name table 410a locks the entry corresponding to the requested contents of block A1 (step 504). Cache table 408a returns the requested data corresponding to block A1 (step 506). For a cache read hit operation, system 500 does not require any further operations such as data updates on cache table 408a, and does not require any further operations on the cache coherence directory generally.

Figure 5B:
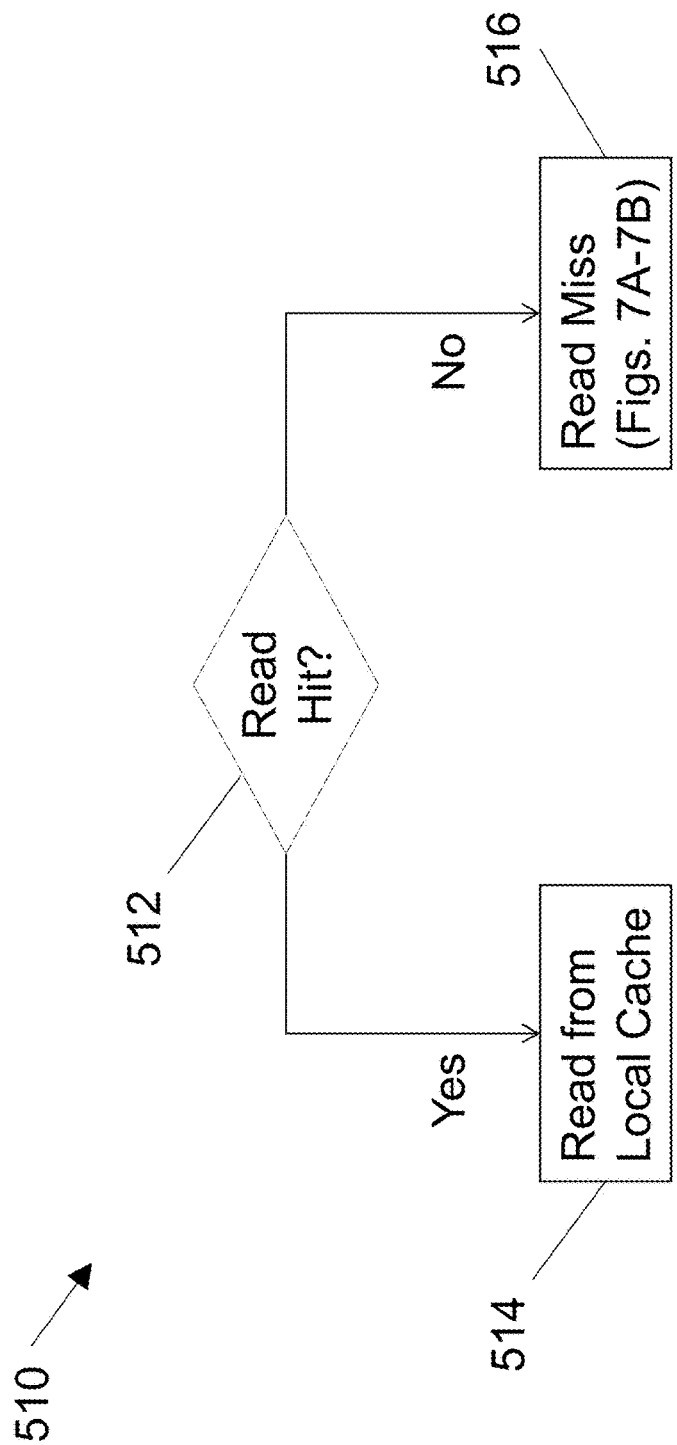
FIG. 5B illustrates a flowchart of an example method in response to a cache read hit using the present cache coherence protocols in accordance with some embodiments.

FIG. 5B illustrates a flowchart of an example method 510 in response to a cache read hit using the present cache coherence protocols in accordance with some embodiments. The present system determines whether there is a cache read hit by looking up a received block in the cache (step 512). If there is a cache read hit (step 512: Yes), the present system proceeds to read the cached data corresponding to the received block from the local cache (step 514). If there is no cache hit (step 512: No), the present system executes a cache read miss operation (step 516). Further details of processing a cache read miss are described below in connection with FIGS. 7A-7B.

Figure 6A:
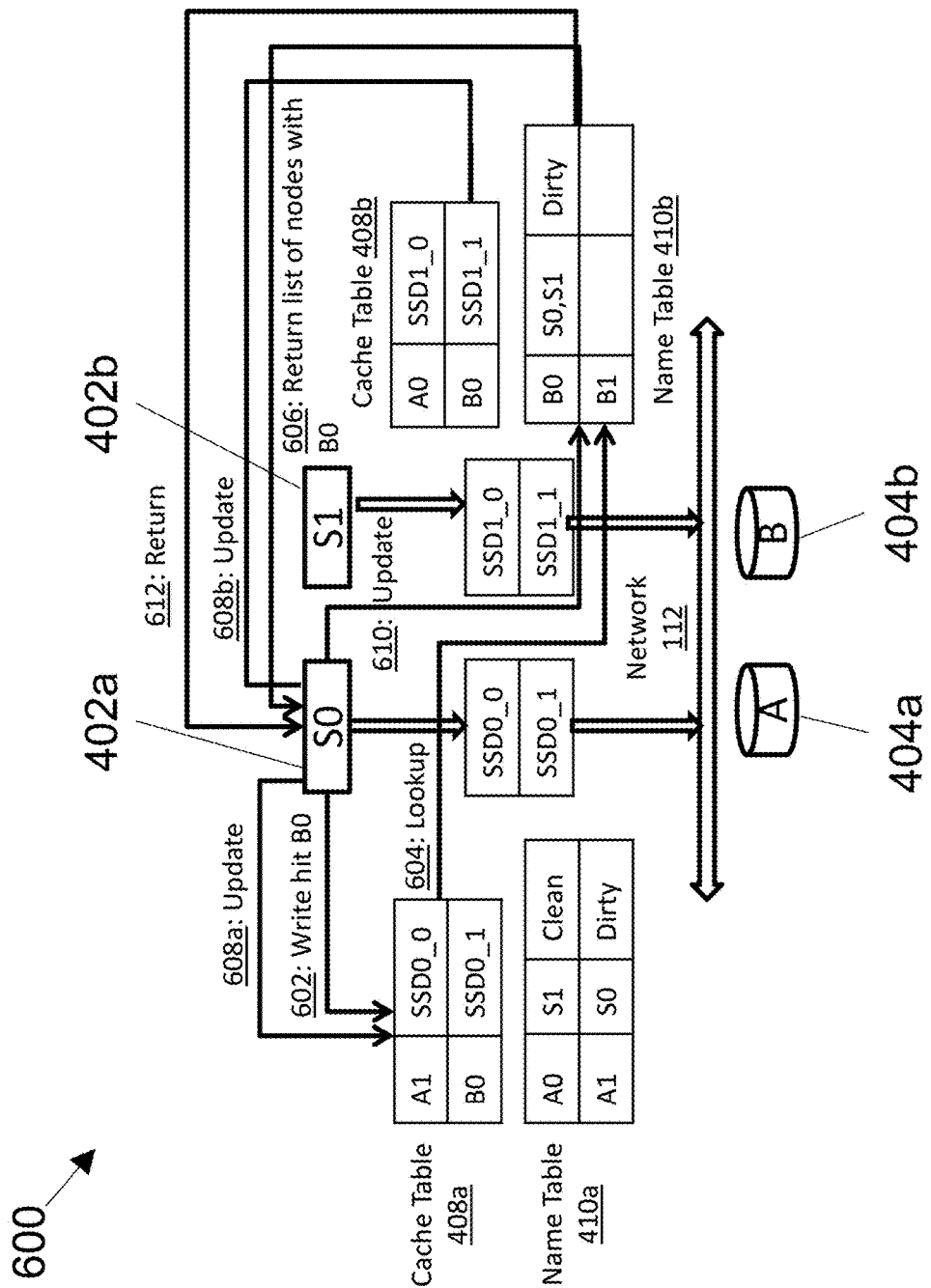
FIG. 6A illustrates example operation of a cache write hit in the present system using the present cache coherence protocols, in accordance with some embodiments.

FIG. 6A illustrates example operation of a cache write hit in system 600 using the present cache coherence protocols, in accordance with some embodiments. System 600 includes servers S0 and S1 (402a-402b) in a multi-server cluster environment. Servers S0 and S1 (402a-402b) may be in communication with storage volumes A and B (404a-404b) over network 112. Server S0 (402a) includes cache table 408a and name table 410a. Server S1 (402b) includes cache table 408b and name table 410b. System 600 sends commands 602-612 to and from various caches and cache coherence directories, described in further detail below. Similar to a cache read hit, a cache write hit occurs if a server finds a requested block in the cache. One benefit of a cache write hit is that the operation performs faster than writing to underlying storage. Specifically, a write operation or write I/O that results in a cache write hit may complete after a successful write to the cache, without having to wait to write to potentially slower underlying storage.

Upon receiving a write request to write data to a requested block, system 600 generally consults the name table to determine the necessary operations to be performed. For example, if system 600 receives a write I/O for data to be written to block B0, system 600 performs different operations based on the name table. Specifically, system 600 looks up the requested block from the received write I/O in cache table 408a, and creates a write hit command (step 602). System 600 consults name table 410b (cache coherence directory) on remote server S1 (402b) that stores information about requested block B0. Name table 410b returns directory information (step 606), including a list of nodes associated with B0. System 600 performs the requested write I/O operation. System 600 further performs an "eager update" by transmitting update commands 608a-608b to other servers caching copies of block B0. System 600 updates directory information stored in the cache coherence directory (step 610), based on returned acknowledgements. System 600 returns (step 612), upon completion of a successful write to the cache.

Figure 6B:
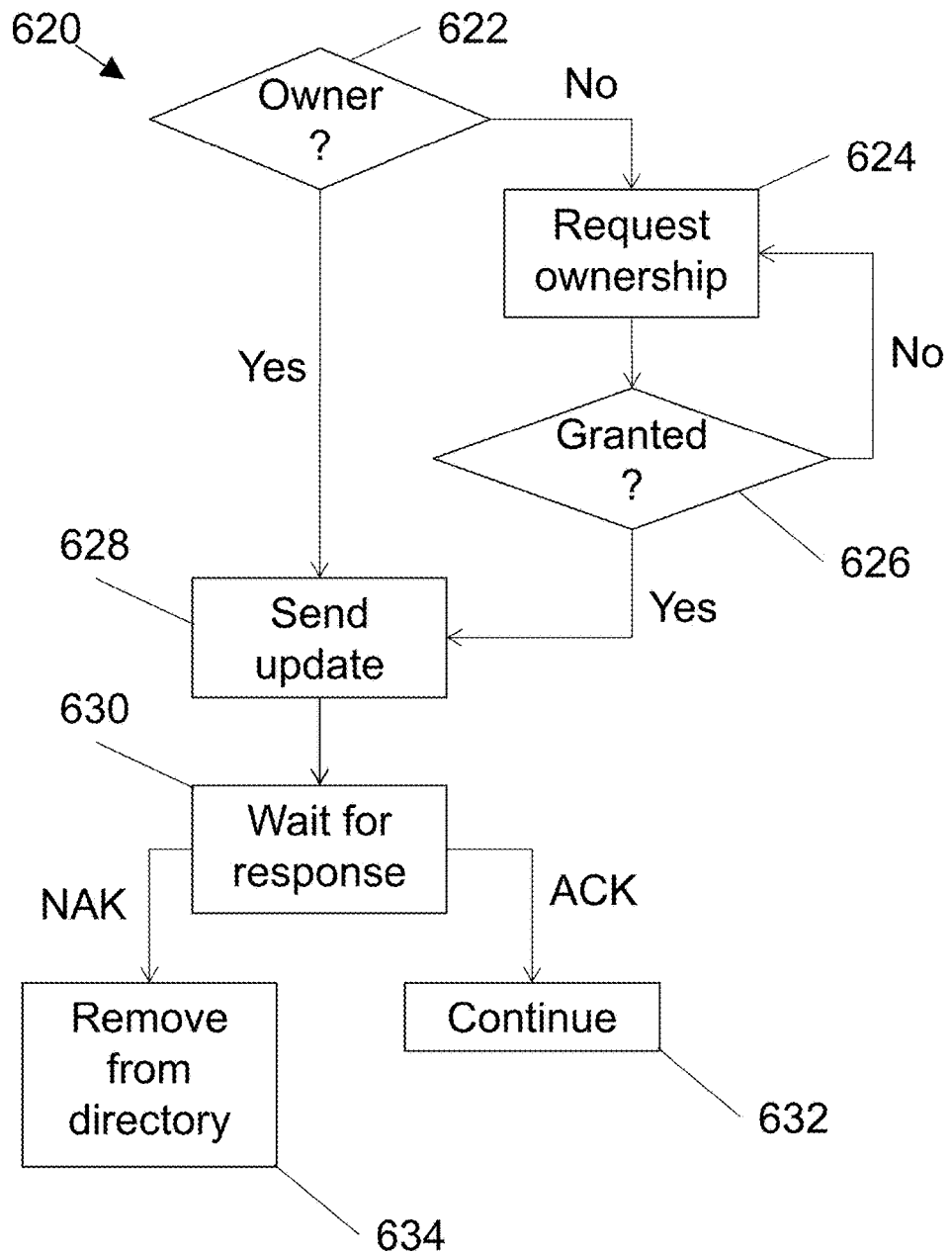
FIG. 6B illustrates a flowchart of an example method for performing a cache write hit using the present cache coherence protocol in accordance with some embodiments.

FIG. 6B illustrates a flowchart of an example method 620 for performing a cache write hit using the present cache coherence protocol in accordance with some embodiments. The present systems determine whether the local cache is an owner of the requested block (step 622). As described earlier in connection with FIG. 1, the "owner" of a requested block refers to a cache identified as responsible for correctness and reliability of the data corresponding to the cached block. If the local cache is not an owner (step 622: No), the present system requests ownership (step 624). The present system checks iteratively whether it has been granted ownership (step 626), and continues to request ownership if the system has not yet been granted ownership (step 626: No).

Upon confirming that the local cache is the owner, the present systems perform an "eager update" by sending a write update message to all caches that contain a copy of the requested block (step 628), and waiting for a response (step 630). Upon receiving the update message, a remote cache updates its local copy based on access patterns. In some embodiments, the access patterns include determining whether the cache block has recently accessed its local copy, or determining how frequently the cache block has accessed its local copy. If the writer receives an acknowledgement message (step 630: ACK) from the remote cache, the ACK indicates the remote update was successful, and the cache write miss operation ends (step 632). Otherwise, the remote cache performs a "lazy invalidate." The remote cache relinquishes its copy by invalidating the local copy and sending a negative acknowledgement (NAK) message back to the writer. Accordingly, if the writer receives a NAK (step 630: NAK), the writer updates the corresponding name table to remove the entry from the cache coherence directory (step 634). The update indicates that the remote cache no longer has a copy, and transmitting a cache update would no longer be necessary the next time the block is written.

Figure 7A:
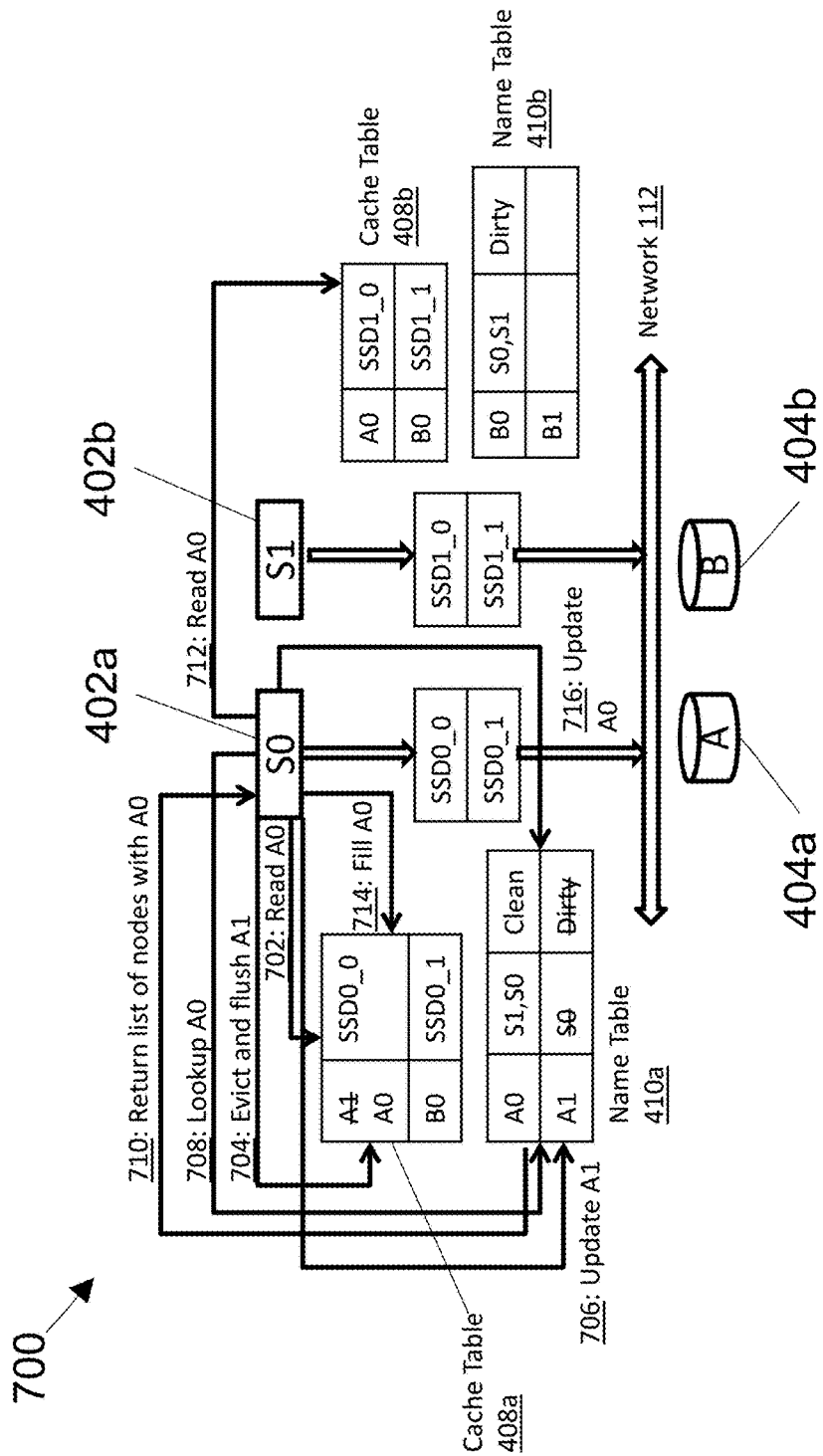
FIG. 7A illustrates example operation of a cache read miss in the present system using the present cache coherence protocols, in accordance with some embodiments.
Figure 8:
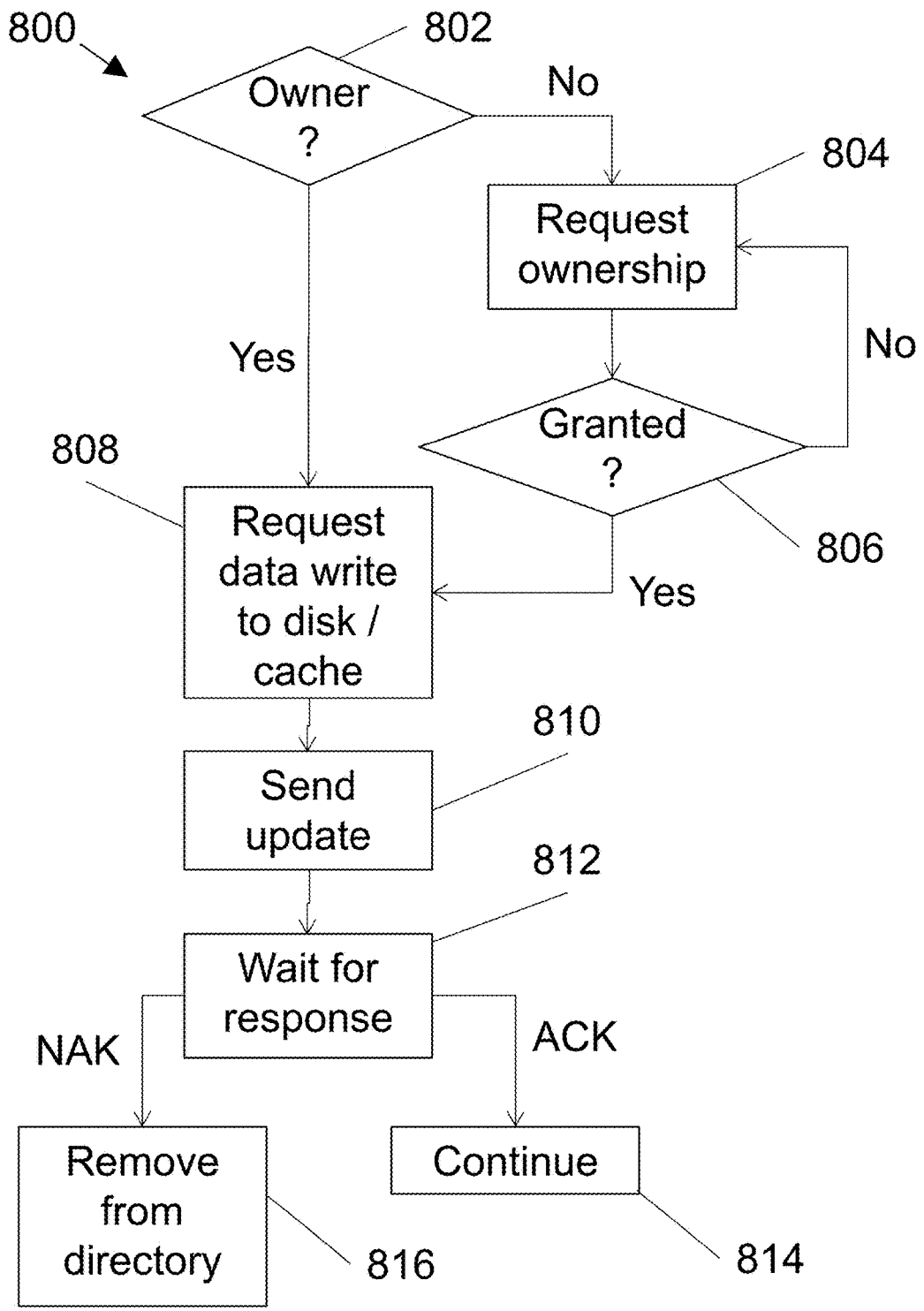
FIG. 8 illustrates a flowchart of an example method for operation of a cache write miss using the present cache coherence protocol, in accordance with some embodiments.

FIG. 7A illustrates example operation of a cache read miss in system 700 using the present cache coherence protocols, in accordance with some embodiments. System 700 includes servers S0 and S1 (402a, 402b). Server S0 (402a) includes a cache coherence directory including cache table 408a and name table 410a. Server S1 (402b) includes a cache coherence directory including cache table 408b and name table 410b. Servers S0 and S1 (402a-402b) are in communication with shared storage volumes A and B (404a-404b) over network 112.

A cache read miss occurs when a server receives a read request or read I/O, and the requested block is not in the local cache. When a read I/O misses from local cache, the present systems load the requested data remotely. Specifically, the present systems load the requested data either from remote shared storage, or from a remote cache that owns the block in the dirty state. The cache read miss operation starts by looking up its local cache table. If the local cache table is full, the present system evicts an existing cache entry. In some embodiments, the present system evicts the existing cache entry by removing the corresponding rows from the local cache table.

For example, server S0 (402a) receives a read I/O request (not shown), requesting the contents of block A0. The read I/O triggers server S0 (402a) to attempt to read A0 (step 702) from cache table 408a. Cache table 408a only contains entries for A1 and B0, therefore the read I/O for block A0 is a cache read miss. The present system selects block A1 as a victim for eviction, based on the Dirty state of block A1 in name table 410a of the cache. Since block A1 is in dirty state in local cache, system 700 performs additional operations to evict block A1. For example, system 700 makes sure the latest version of data corresponding to block A1 is written through to underlying storage (step 704), and updates corresponding name table 410a (step 706). At this point, system 700 has created space in local cache to hold missed block A0. System 700 consults name table 410a of the cache coherence directory to look up block A0 (step 708). System 700 receives a list of nodes with A0 (step 710) and finds that server S1 (402b) has a copy of the latest data corresponding to block A0, referred to by cache table 408b. Server S0 (402b) reads the requested data corresponding to block A0 (step 712) from server S1 (402b). Server S1 (402b) supplies to server S0 (402a) the requested data corresponding to block A0, and server S0 (402a) writes the updated reference to block A0 to cache table 408a (step 714), filling the space previously occupied by block A1 and thereby writing the block into local cache for server S0 (402a). As a result, server S0 updates both cache table 408a and name table 408b (step 716) so that future accesses to block A0 are more likely to result in a read cache hit or write cache hit.

Figure 7B:
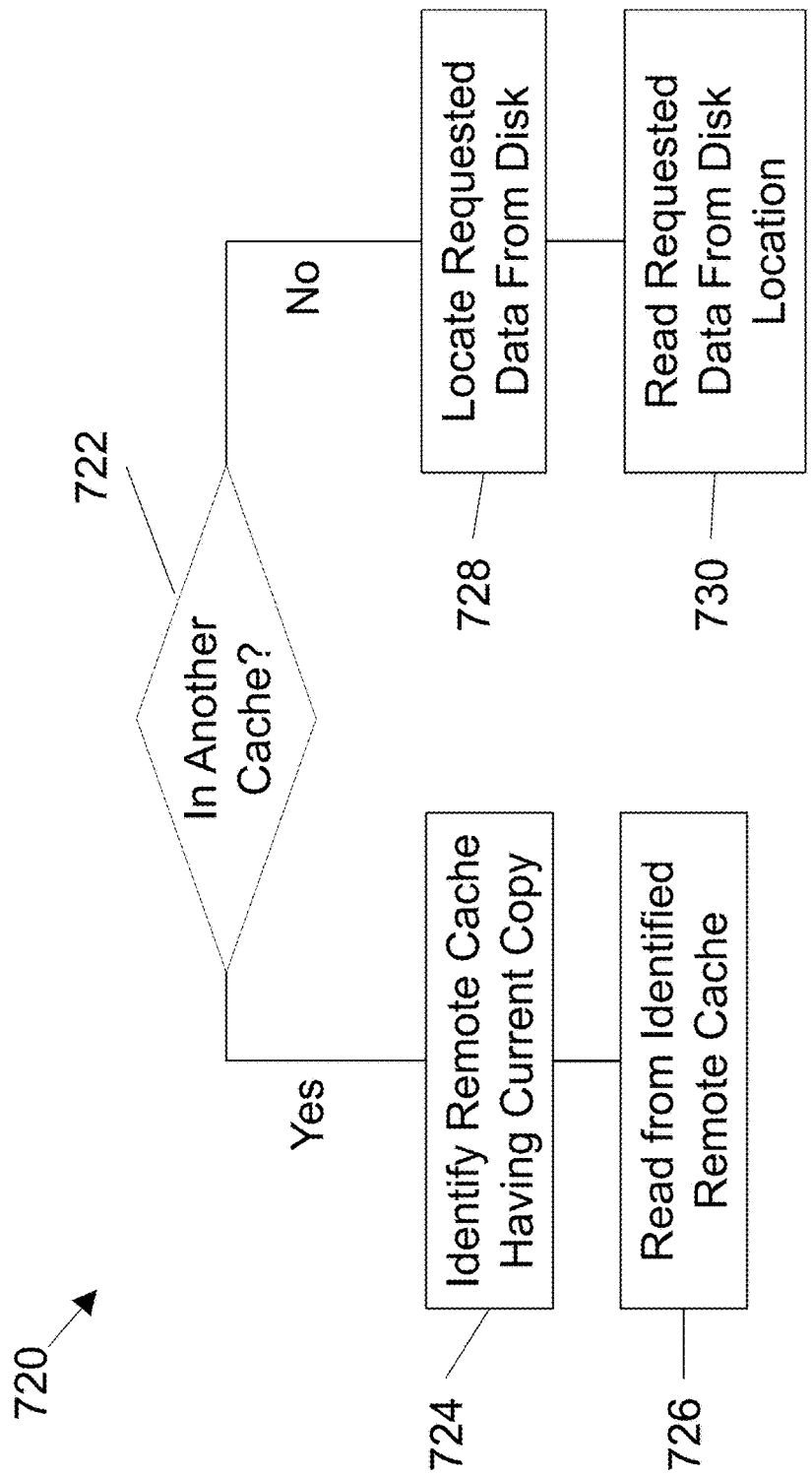
FIG. 7B illustrates a flowchart of an example method for operation of a cache read miss using the present cache coherence protocols, in accordance with some embodiments.

FIG. 7B illustrates a flowchart of an example method 720 for operation of a cache read miss using the present cache coherence protocols, in accordance with some embodiments. The present systems determine whether requested data is in another cache (step 722). If so (step 722: Yes), the present systems identify a remote cache storing a current copy of the requested data. In some embodiments, the identification may be based on a cache coherence directory including a cache table and name table, as described earlier in connection with FIG. 7A. The present systems read the requested data from the identified remote cache (step 726), and return the requested data to the reader. If the requested data is not in another cache (step 722: No), the present systems retrieve the requested data from remote shared storage. Specifically, the present systems locate the requested data on disk to determine a disk location (step 728). The present systems proceed to read the requested data from the disk location (step 730), and return the requested data to the reader.

FIG. 8 illustrates a flowchart of an example method 800 for operation of a cache write miss using the present cache coherence protocol, in accordance with some embodiments. A cache write miss occurs when a writer sends a write request or write I/O to write requested data to a block, and the requested block is not in the cache. If the requester is the owner of the requested block (step 802: Yes), the requester proceeds with the write operation as soon as the block is in its cache. Upon a cache write miss, the requester finds the block either in shared storage or in one of the caches, and writes the requested data (step 808). The requester performs an "eager update" and sends the update message to all caches having a copy of the block (step 810). If the requester is not an owner of the block (step 802: No), the requester obtains ownership first (steps 804-806) before performing the requested write operation. The corresponding eager update (steps 810-816) is similar to the cache write hit operation described in connection with FIG. 6B (steps 628-634). Also as described earlier, during the update process, some caches perform "lazy invalidates" to invalidate their cached copy depending on the access patterns of the block. Other caches may choose to update their copy of the requested block, based on access patterns of the block.

Those of skill in the art would appreciate that the various illustrations in the specification and drawings described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware, software, or a combination depends upon the particular application and design constraints imposed on the overall system. Skilled artisans may implement the described functionality in varying ways for each particular application. Various components and blocks may be arranged differently (for example, arranged in a different order, or partitioned in a different way) all without departing from the scope of the subject technology.

Furthermore, an implementation of the present methods and systems may be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present method may also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention may be embodied in other specific forms without departing from the spirit or essential attributes thereof, and accordingly, reference should be had to the following claims, rather than to the foregoing specification, as indicating the scope of the invention.

The present disclosure has been described in detail with specific reference to these illustrated embodiments. It will be apparent, however, that various modifications and changes may be made within the spirit and scope of the disclosure as described in the foregoing specification, and such modifications and changes are to be considered equivalents and part of this disclosure.

The invention claimed is:

1. A method of updating a cache in a clustered server environment comprising a first server and a second server, the method comprising:

receiving a request to write data to a first block of a first cache associated with the first server in the clustered server environment;

identifying a second cache associated with the second server in the clustered environment;

determining whether a second block cached in the second cache is inactive based at least in part on access patterns of the second block for invalidating the second block of the second cache; and transmitting a request to the second server to invalidate the second block in the second cache when the second block cached in the second cache was determined to be inactive.

2. The method of claim 1, wherein identifying the second cache comprises identifying the second cache for invalidating the second block of the second cache based at least in part on access patterns of the second block by the second server.

3. The method of claim 1, wherein the second block of the second cache maintains a copy of the first block of the first cache.

4. The method of claim 1, wherein the access patterns comprise at least one of a frequency of access of the second block or a recency of access of the second block.

5. The method of claim 1, further comprising:
identifying a third cache storing a copy of the first block, wherein the third cache is associated with a third server in the clustered environment; and
transmitting a request to update the third cache with the received write data, whereby future requests are able to process the received write data from the third cache.

6. The method of claim 5, wherein identifying the third cache comprises looking up the first block from one or more cache coherence tables tracking blocks and associated servers; and wherein the one or more cache coherence tables are distributed across a plurality of servers.

7. The method of claim 6, wherein the one or more cache coherence tables are partitioned into subtables according to a hash function.

8. The method of claim 6, wherein the transmitting the request to update the third cache comprises:
identifying a corresponding row of the one or more cache coherence tables based on the first block;
updating a corresponding cache status of the corresponding row; and
transmitting the request to update the third block of the third cache with the received write data.

9. A server for updating a cache in a clustered environment, the server comprising:
a cache configured to store a plurality of blocks and data associated with the plurality of blocks; and
a processor in communication with the cache;
a memory comprising instructions, wherein the instructions, when executed by the processor, cause the processor to:
receive, over a memory bus, a request to write data to a first block of the cache;
identify a second cache associated with a second server in the clustered environment;
determine whether a second block cached in the second cache is inactive based at least in part on access patterns of the second block for invalidating the second block of the second cache; and
transmit a request to the second server to invalidate the second block of the second cache when the second block cached in the second cache was determined to be inactive.

10. The server of claim 9, wherein the instructions, when executed by the processor, further cause the processor to identify the second cache for invalidating the second block of the second cache, based at least in part on the access patterns of the second block by the second server.

11. The server of claim 9, wherein the access patterns comprise at least one of a frequency of access of the block or a recency of access of the block.

12. The server of claim 9, wherein the instructions, when executed by the processor, further cause the processor to:
identify a third cache storing a copy of the first block, wherein the third cache is associated with a third server in the clustered environment; and
transmit, over the memory bus, a request to update the third cache with received write data, wherein future requests are able to process the received write data from the third cache.

13. The server of claim 12, wherein the identifying the third cache comprises looking up the first block from one or more cache coherence tables tracking blocks and associated servers; and wherein the one or more cache coherence tables are distributed across a plurality of servers.

14. The server of claim 13, wherein the one or more cache coherence tables are partitioned into sub-tables according to a hash function.

15. The server of claim 13, wherein the instructions, when executed by the processor, further cause the processor to:
identify a corresponding row of the one or more cache coherence tables based on the first block;
update a corresponding cache status of the corresponding row; and
transmit the request to update the third block of the third cache with the received write data.

16. The server of claim 9, wherein the second block of the second cache maintains a copy of the first block of the first cache.

17. A non-transitory computer program product for updating a cache in a clustered environment, tangibly embodied in a computer-readable medium, the computer program product including instructions operable to cause a data processing apparatus to:
receive a request to write data to a first block of a first cache associated with a first server in the clustered environment;
identify a second cache associated with a second server in the clustered environment;
determine whether a second block cached in the second cache is inactive based at least in part on access patterns of the second block for invalidating the second block of the second cache; and
transmit a request to the second server to invalidate the second block in the second cache when the second block cached in the second cache was determined to be inactive.

18. The computer program product of claim 17, wherein the access patterns comprise at least one of a frequency of access of the second block or a recency of access of the second block.

19. The computer program product of claim 17, further comprising instructions operable to cause the data processing apparatus to:
identify a third cache storing a copy of the first block, wherein the third cache is associated with a third server in the clustered environment; and
transmit a request to update the third cache with received write data, wherein future requests are able to process the received write data from the third cache.

20. The computer program product of claim 19, wherein the instructions operable to cause the data processing apparatus to identify the third cache comprise instructions operable to cause the data processing apparatus to look up the first block from one or more cache coherence tables tracking blocks and associated servers; and wherein the one or more cache coherence tables are distributed across a plurality of servers.

* * * * *